United States Patent
Lim et al.

(10) Patent No.: US 9,215,438 B2
(45) Date of Patent: Dec. 15, 2015

(54) INTERMEDIATE IMAGE GENERATION APPARATUS AND METHOD

(75) Inventors: Il Soon Lim, Hongseong-gun (KR); Young Shin Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 748 days.

(21) Appl. No.: 12/457,689

(22) Filed: Jun. 18, 2009

(65) Prior Publication Data

US 2010/0194858 A1   Aug. 5, 2010

(30) Foreign Application Priority Data

Feb. 2, 2009   (KR) .................. 10-2009-0007875

(51) Int. Cl.
*H04N 13/02* (2006.01)
*H04N 13/00* (2006.01)

(52) U.S. Cl.
CPC ................................. *H04N 13/0011* (2013.01)

(58) Field of Classification Search
CPC .............. H04N 13/02; H04N 13/0275; H04N 13/0018; H04N 2013/0081; H04N 13/0011; G06T 13/20; G06T 7/0051; G06T 7/0022; G06T 7/0053; G06T 7/0055; G06T 7/0059; G06T 7/0061; G06T 7/0065
USPC .......................................................... 348/46
See application file for complete search history.

(56) References Cited

U.S. PATENT DOCUMENTS

| | | | | |
|---|---|---|---|---|
| 5,768,404 | A * | 6/1998 | Morimura et al. | 382/107 |
| 7,092,015 | B1 * | 8/2006 | Sogawa | 348/222.1 |
| 7,672,378 | B2 * | 3/2010 | Ng et al. | 375/240.26 |
| 7,742,657 | B2 * | 6/2010 | Kim et al. | 382/284 |
| 2004/0240725 | A1 * | 12/2004 | Xu et al. | 382/154 |
| 2007/0086645 | A1 * | 4/2007 | Kim et al. | 382/154 |
| 2010/0103249 | A1 * | 4/2010 | Lipton et al. | 348/51 |
| 2011/0115886 | A1 * | 5/2011 | Nguyen et al. | 348/47 |

FOREIGN PATENT DOCUMENTS

KR   10-2004-0011331 B1   8/2005

OTHER PUBLICATIONS

Multi-step View Synthesis with occlusion handling; VMV Nov. 2001; B.J. Lei and E.A. Hendriks.*
"Data Processing Algorithms for Generating Textured 3D Building Facade Meshes from Laser Scans and Camera Images", International Journal of Computer Vision 61(2), 159-184, 2005, (hereinafter Frueh).*
Korean Office Action issued Feb. 9, 2015 in counterpart Korean Patent Application No. KR 10-2009-0007875 (5 pages, in Korean and a partial English Translation).

* cited by examiner

*Primary Examiner* — Mohammed Rahaman
(74) *Attorney, Agent, or Firm* — NSIP Law

(57) ABSTRACT

An intermediate image generation apparatus and method are described. An intermediate image may be generated from any one image of a left image and a right image, and the intermediate image may be interpolated by referring to the other image of the left image and the right image.

9 Claims, 4 Drawing Sheets

INTERMEDIATE IMAGE GENERATION APPARATUS AND METHOD

CROSS-REFERENCE TO RELATED APPLICATIONS

This application claims the benefit of Korean Patent Application No. 10-2009-0007875, filed on Feb. 2, 2009, in the Korean Intellectual Property Office, the disclosure of which is incorporated herein by reference.

BACKGROUND

1. Field

One or more example embodiments relate to an intermediate image generation apparatus and method, and more particularly, to an intermediate image generation apparatus and method which may prevent a hole or a blurring phenomenon from occurring when generating an intermediate image.

2. Description of the Related Art

A multi-view image that provides viewers with a three-dimensional (3D) effect may be generated by geometrically modifying and spatially processing images taken by at least two cameras.

A multi-view image may be associated with a 3D image processing technology providing viewers with multiple viewpoint images. That is, a multi-view image may be associated with technologies that may provide a more stereoscopic image by obtaining an identical 3D image using at least two cameras.

Currently, a variety of research has been conducted on a super multi-view (SMV) image and a free viewpoint television (FTV), as well as a multi-view image.

In general, a view interpolation for a multi-view image may be divided into image-based rendering and image interpolation using a disparity.

The image-based rendering may generate an arbitrary viewpoint image using two-dimensional (2D) images from a plurality of viewpoints. Also, the image interpolation using a disparity for an FTV may measure a disparity of each pixel, and obtain an intermediate pixel of a desired position using the disparity.

As described above, since interest in a multi-view image has increased, research to improve a 3D image processing technology associated with a multi-view image is required.

SUMMARY

According to example embodiments, an intermediate image generation apparatus may be provided. The apparatus may include a generation unit to generate an intermediate image from any one image of a left image and a right image by referring to a disparity map of the one image of the left image and the right image, and an interpolation unit to interpolate the intermediate image by referring to the other image of the left image and the right image.

According to example embodiments, an intermediate image generation method may be provided. The method may include generating an intermediate image from any one image of a left image and a right image by referring to a disparity map of the one image of the left image and the right image, and interpolating the intermediate image by referring to the other image of the left image and the right image.

Example embodiments may provide an intermediate image generation apparatus and method which may generate an intermediate image from a left image and a right image, and thereby may prevent a hole or a blurring phenomenon from occurring.

Additional aspects of the example embodiments will be set forth in part in the description which follows and, in part, will be apparent from the description, or may be learned by practice of the embodiments.

BRIEF DESCRIPTION OF THE DRAWINGS

These and/or other aspects will become apparent and more readily appreciated from the following description of the example embodiments, taken in conjunction with the accompanying drawings of which.

DETAILED DESCRIPTION

Figure 1:
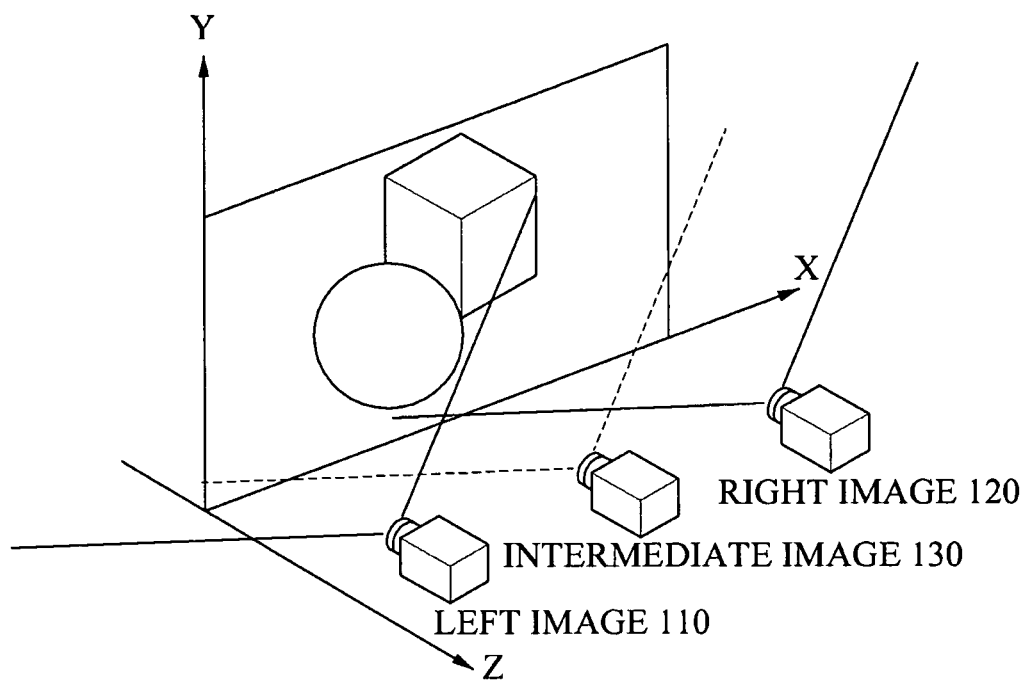
FIG. 1 conceptually illustrates a relationship of a left image, a right image, and an intermediate image according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 conceptually illustrates a relationship of a left image 110, a right image 120, and an intermediate image 130 according to example embodiments.

When a stereoscopic image is input, a multi-view image or a super multi-view image (SMV) may be generated by synthesizing the intermediate image 130 using the left image 110 or the right image 120.

In general, when the intermediate image 130 is synthesized using the left image 110 or the right image 120, a blurring phenomenon may occur in the intermediate image 130, since an occlusion region may be included in the intermediate image 130 or images of different viewpoints may be overlapped.

An intermediate image generation apparatus according to example embodiments may generate the intermediate image 130 from any one of the left image 110 and the right image 120 by referring to a disparity map of the one image, and by interpolating the intermediate image 130 by referring to the other image of the left image 110 and the right image 120.

Accordingly, the intermediate image generation apparatus may prevent either a hole or a blurring phenomenon, or both, from occurring in the intermediate image 130.

Hereinafter, the intermediate image generation apparatus is described in detail with reference to FIGS. 2 and 3.

Figure 2:
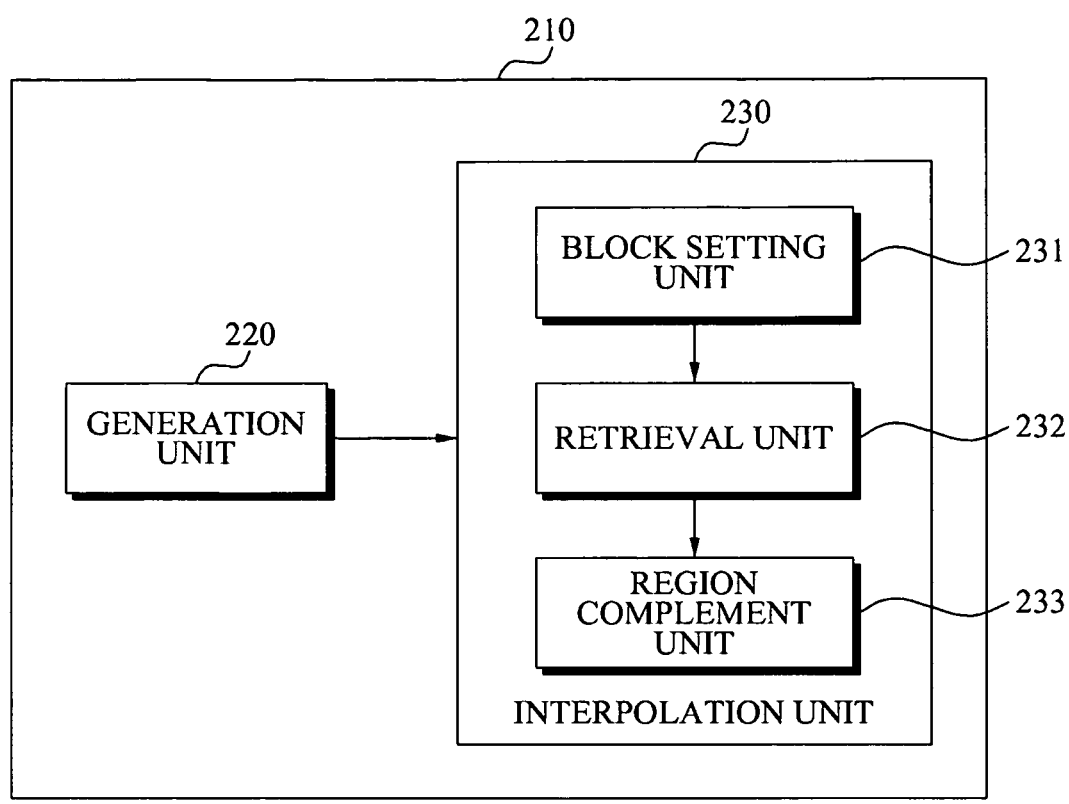
FIG. 2 illustrates a configuration of an intermediate image generation apparatus according to example embodiments.

FIG. 2 illustrates a configuration of an intermediate image generation apparatus 210 according to example embodiments.

The intermediate image generation apparatus 210 may include a generation unit 220 and an interpolation unit 230.

The generation unit 220 may generate the intermediate image 130 from any one image of the left image 110 and the right image 120 by referring to a disparity map of the one image.

According to example embodiments, the generation unit 220 may shift at least one pixel included in the one image, by referring to the disparity map to generate the intermediate image 130.

For example, the generation unit 220 may shift at least one pixel of the left image 110 to the right, by referring to a disparity map of the left image 110, and thereby may generate the intermediate image 130.

Also, the generation unit 220 may shift at least one pixel of the right image 120 to the left, by referring to a disparity map of the right image 120, and thereby may generate the intermediate image 130.

In this instance, the generation unit 220 may generate the intermediate image 130 according to Equation 1 given as below.

$$I_\alpha(x, y) = I_L(x + \lfloor \alpha \cdot d(x, y) \rfloor, y) \quad \text{Equation 1}$$
$$= I_R(x + \lfloor (\alpha - 1) \cdot d(x, y) \rfloor, y)$$

where $I_\alpha$, $I_L$, and $I_R$ may denote the intermediate image 130, the left image 110, and the right image 120, respectively. Also, $\lfloor \ \rfloor$ may denote a floor operator.

Referring to Equation 1, the generation unit 220 may shift at least one pixel of the left image $I_L$ 110 to the right by a predetermined disparity $\lfloor \alpha \cdot d(x,y) \rfloor$, and thereby may generate the intermediate image $I_\alpha$ 130.

Also, the generation unit 220 may shift at least one pixel of the right image $I_R$ 120 to the left by a predetermined disparity $\lfloor (\alpha-1) \cdot d(x,y) \rfloor$, and thereby may generate the intermediate image $I_\alpha$ 130.

In this instance, a value of a may be arbitrarily set by a user. When the intermediate image 130 is generated in a center location, the user may set a as 0.5.

According to example embodiments, the generation unit 220 may generate the intermediate image 130 with respect to the one image of the left image 110 and the right image 120 using any one of a forward process and a backward process.

An operation of the generation unit 220 is described in greater detail below.

Generation of the intermediate image 130 from the left image 110 using the forward process is described.

The generation unit 220 may shift the at least one pixel of the left image 110 by a predetermined disparity $\alpha \cdot d(x,y)$ after initializing the intermediate image 130 to be null. Also, the generation unit 220 may store a Red, Green, and Blue (RGB) color information of the left image 110 in a location of the at least one shifted pixel, and thereby may generate the intermediate image 130.

In this instance, the location of the at least one shifted pixel may be a location of at least one pixel included in the intermediate image 130.

When at least two pixels are shifted to a same location as a result of the pixel shifting, the generation unit 220 may select a pixel with a greater disparity from the at least two pixels.

Generation of the intermediate image 130 from the left image 110 using the backward process is described.

The generation unit 220 may shift the at least one pixel of the left image 110 by a predetermined disparity $\alpha \cdot d(x,y)$ on the disparity map of the left image 110 after initializing a disparity map of the intermediate image 130 to be null. Also, the generation unit 220 may store a disparity, stored in the disparity map of the left image 110, in a location of the at least one shifted pixel, and thereby may generate the disparity map of the intermediate image 130.

In this instance, the location of the at least one shifted pixel may be a location of at least one pixel included in the intermediate image 130 on the disparity map of the intermediate image 130.

When at least two pixels are shifted to a same location as a result of the pixel shifting, the generation unit 220 may select a pixel with a greater disparity from the at least two pixels.

Subsequently, the generation unit 220 may call up the RGB color information of the left image 110 using the disparity map of the intermediate image 130, and thereby may generate the intermediate image 130 using the RGB color information.

The interpolation unit 230 may interpolate the intermediate image 130 by referring to the other image. Here, the other image may indicate an image not used for generating the intermediate image 130 from among the left image 110 and the right image 120.

For example, when the generation unit 220 generates the intermediate image 130 by shifting the at least one pixel of the left image 110, the interpolation unit 230 may interpolate the intermediate image 130 by referring to the right image 120.

Conversely, when the generation unit 220 generates the intermediate image 130 by shifting the at least one pixel of the right image 120, the interpolation unit 230 may interpolate the intermediate image 130 by referring to the left image 110.

According to example embodiments, when a hole occurs in the intermediate image 130, due to a quantization error of the shifting, the interpolation unit 230 may interpolate the hole using an average value of pixels adjacent to the hole.

A hole, which is an area without RGB color information, may occur in the intermediate image 130.

The hole may occur due to the quantization error generated by the shifting of the at least one pixel, or due to an occlusion region that may be generated when the intermediate image 130 is generated, or due to both.

In this instance, when the hole occurs in the intermediate image 130 due to the quantization error, the interpolation unit 230 may interpolate the hole using an average value of pixels adjacent to the hole.

A large hole that may be noticed by a viewer may occur in the intermediate image 130, since the occlusion region may appear in the intermediate image 130.

Accordingly, the interpolation unit 230 may include a block setting unit 231, a retrieval unit 232, and a region complement unit 233 to interpolate the occlusion region occurring in the intermediate image 130.

When the occlusion region exists in the intermediate image 130, the block setting unit 231 may set a reference block with respect to an adjacent area of the occlusion region. The reference block may have a predetermined size.

The retrieval unit 232 may retrieve a sub-reference block matching the reference block with respect to the other image of the left image 110 and the right image 120.

In this instance, according to example embodiments, the retrieval unit 232 may divide the other image into at least one candidate block, and calculate a predetermined cost function of the reference block and the at least one candidate block. The at least one candidate block may be the same size as the reference block.

Also, the retrieval unit 232 may retrieve a block having a smallest value of the cost function from among the at least one candidate block, and thereby may select the retrieved block as the sub-reference block.

In this instance, according to example embodiments, the retrieval unit 232 may use a Mean of Absolute Difference (MAD) of the RGB color information as the cost function.

The region complement unit 233 may complement the occlusion region by referring to the other image based on the sub-reference block.

In this instance, according to example embodiments, the region complement unit 233 may set an area larger than the sub-reference block with respect to the other image as a complementary block. Here, the area may include the sub-reference block. Also, the region complement unit 233 may complement the occlusion region by referring to the complementary block.

An example of an operation of the interpolation unit 230 is described in detail with reference to FIG. 3.

Figure 3:
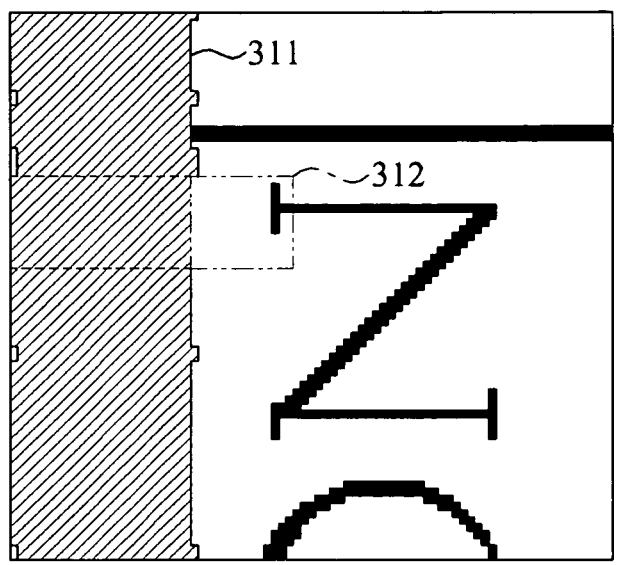
FIG. 3 conceptually illustrates an operation of an interpolation unit according to example embodiments.
Figure 3:
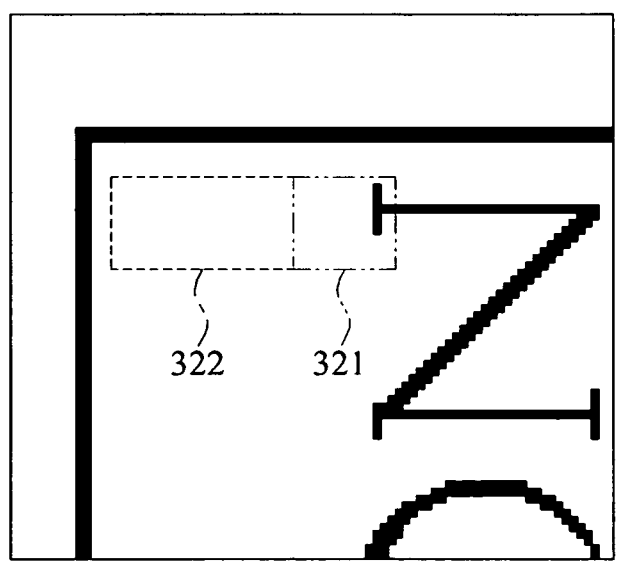

FIG. 3 conceptually illustrates an operation of the interpolation unit 230 according to example embodiments.

It may be assumed that the generation unit 220 generates the intermediate image 130 from the left image 110 and the interpolation unit 230 interpolates the intermediate image 130 using the right image 120.

The intermediate image 130 is illustrated in a graphical representation 310, and the right image 120 is illustrated in a graphical representation 320.

When the generation unit 220 generates the intermediate image 130 from the left image 110, an occlusion region 311 may occur in the intermediate image 130 as illustrated in the graphical representation 310 of FIG. 3.

In this instance, the block setting unit 231 may set a reference block 312 with respect to an adjacent area of the occlusion region 311. The reference block 312 may have a predetermined size.

It is illustrated that the block setting unit 231 may set the reference block 312 in a right adjacent area of the occlusion region 311, in the graphical representation 310 as an example.

When the block setting unit 231 may set the reference block 312, the retrieval unit 232 may retrieve a sub-reference block 321 matching the reference block 312 with respect to the right image 120.

That is, the retrieval unit 232 may retrieve an area matching the reference block 312 in the right image 120 as the sub-reference block 321, as illustrated in the graphical representation 320 of FIG. 3.

When the retrieval unit 232 retrieves the sub-reference block 321, the region complement unit 233 may set an area larger than the sub-reference block 321 with respect to the right image 120 as a complementary block 322, and complement the occlusion region 311 by referring to the complementary block 322. Here, the area may include the sub-reference block 321.

It is illustrated that the region complement unit 233 may set the complementary block 322 in a left area of the sub-reference block 321, in the graphical representation 320 as an example. Here, the complementary block 322 may include the sub-reference block 321 and be larger than the sub-reference block 321.

That is, the region complement unit 233 may set the left area of the sub-reference block 321 as the complementary block 322, and then complement the occlusion region 311 by referring to the complementary block 322.

In this instance, the interpolation unit 230 may iteratively perform the above-described operation, and thereby may interpolate the intermediate image 130 even when the occlusion region 311 in the intermediate image 130 is significantly large.

Figure 4:
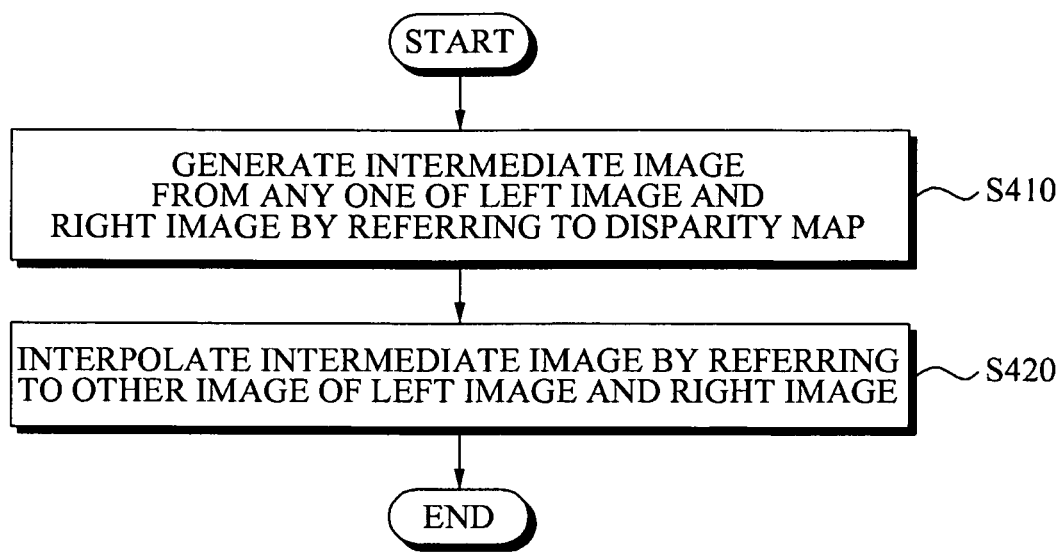
FIG. 4 illustrates a flowchart of an intermediate image generation method according to example embodiments.

FIG. 4 illustrates a flowchart of an intermediate image generation method according to example embodiments.

In operation S410, an intermediate image may be generated from any one of a left image and a right image by referring to a disparity map of the one image.

According to example embodiments, in operation S410, at least one pixel included in the one image may be shifted by referring to the disparity map to generate the intermediate image.

In operation S420, the intermediate image may be interpolated by referring to the other image of the left image and the right image. The intermediate image may be output or displayed, e.g., on a display device.

According to example embodiments, in operation S420, when a hole occurs in the intermediate image due to a quantization error of the shifting, the hole may be interpolated using an average of pixels adjacent to the hole.

According to example embodiments, in operation S420, when an occlusion region exists in the intermediate image, a reference block with respect to an adjacent area of the occlusion region may be set. The reference block may have a predetermined size. A sub-reference block matching the reference block with respect to the other image may be retrieved. Also, the occlusion region may be complemented by referring to the other image based on the sub-reference block.

According to example embodiments, in operation S420, the other image may be divided into at least one candidate block of the same size as the reference block. Also, in operation S420, a predetermined cost function of the reference block and the at least one candidate block may be calculated.

Also, in operation S420, a block having a smallest value of the cost function may be retrieved from the at least one candidate block, and the retrieved block may be selected as the sub-reference block.

The intermediate image generation method has been described with reference to FIG. 4. The intermediate image generation method may be the same as or similar to the intermediate image generation apparatus described above with reference to FIGS. 1 and 3, and thus further detailed descriptions will be omitted here.

The intermediate image generation method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa. The software modules may be executed on any processor, general purpose computer, or special purpose computer including an intermediate image generation apparatus.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. An intermediate image generation apparatus, comprising:

a non-transitory computer readable recording medium storing a program and a hardware processor executing the program to operate as:
a generation unit to generate an intermediate image using one image from among a left image and a right image, and by referring to a disparity map of the one image; and
an interpolation unit to interpolate the intermediate image by referring to the other image from among the left image and the right image, which was not used to generate the intermediate image,
wherein the interpolation unit comprises:
a block setting unit to set, when an occlusion region exists in the intermediate image, a reference block including a non-occlusion region and located at an adjacent area of the occlusion region in the intermediate image, the reference block having a predetermined size;
a retrieval unit to retrieve a sub-reference block in the other image matching the non-occlusion region from the reference block; and
a region complement unit to complement the occlusion region in the intermediate image by applying a complementary block to the occlusion region, the complementary block being obtained directly from the other image and including the sub-reference block and an adjacent area of the sub-reference block,
wherein the adjacent area of the sub-reference block in the complementary block is larger than the sub-reference block;
wherein the adjacent area of the sub-reference block in the complementary block is used to complement the occlusion region, and
the resolution of the complemented occlusion region is maintained with a resolution of the sub-reference block, thereby blurring effect of the intermediate image is prevented.

2. The intermediate image generation apparatus of claim 1, wherein the generation unit shifts at least one pixel included in the one image, by referring to the disparity map to generate the intermediate image.

3. The intermediate image generation apparatus of claim 2, wherein, when a hole exists in the intermediate image, the interpolation unit interpolates the hole using an average of pixels adjacent to the hole.

4. The intermediate image generation apparatus of claim 2, wherein the generation unit generates the intermediate image using any one of a forward process and a backward process with respect to the one image,
wherein the forward process comprises storing color information of the one image in a location of the at least one shifted pixel to generate the intermediate image, and
the backward process comprises storing disparity information of the one image in a location of the at least one shifted pixel to generate the disparity map of the intermediate image, and retrieving color information of the one image using the disparity map of the one image to generate the intermediate image.

5. The intermediate image generation apparatus of claim 1, wherein the retrieval unit divides the other image into at least one candidate block, calculates a cost function of the reference block and the at least one candidate block, and retrieves a block having a smallest value of the cost function from among the at least one candidate block to select the sub-reference block.

6. An intermediate image generation method, comprising:
generating, by a processor, an intermediate image using one image from among a left image and a right image, and by referring to a disparity map of the one image; and
interpolating, by the processor, the intermediate image by referring to the other image from among the left image and the right image, which was not used to generate the intermediate image,
wherein, when an occlusion region exists in the intermediate image, the interpolating comprises:
setting a reference block including a non-occlusion region and located at an adjacent area of the occlusion region in the intermediate image;
retrieving a sub-reference block in the other image matching the non-occlusion region from the reference block, and
complementing the occlusion region in the intermediate image by applying a complementary block to the occlusion region, the complementary block being obtained directly from the other image and including the sub-reference block and an adjacent area of the sub-reference block,
wherein the adjacent area of the sub-reference block in the complementary block is larger than the sub-reference block,
wherein the adjacent area of the sub-reference block in the complementary block is used to complement the occlusion region, and
the resolution of the complemented occlusion region is maintained with a resolution of the sub-reference block, thereby blurring effect of the intermediate image is prevented.

7. The intermediate image generation method of claim 6, wherein the generating shifts at least one pixel included in the one image by referring to the disparity map to generate the intermediate image.

8. The intermediate image generation method of claim 7, wherein, when a hole exists in the intermediate image, the interpolating interpolates the hole using an average of pixels adjacent to the hole.

9. A non-transitory computer readable recording medium encoded with a computer program causing a computer to execute a method comprising:
generating an intermediate image using one image from among a left image and a right image, and by referring to a disparity map of the one image; and
interpolating the intermediate image by referring to the other image from among the left image and the right image, which was not used to generate the intermediate image,
wherein, when an occlusion region exists in the intermediate image, the interpolating comprises:
setting a reference block including a non-occlusion region and located at an adjacent area of the occlusion region in the intermediate image;
retrieving a sub-reference block in the other image matching the non-occlusion region from the reference block, and
complementing the occlusion region in the intermediate image by applying a complementary block to the occlusion region, the complementary block being obtained directly from the other image and including the sub-reference block and an adjacent area of the sub-reference block,
wherein the adjacent area of the sub-reference block in the complementary block is larger than the sub-reference block,
wherein the adjacent area of the sub-reference block in the complementary block is used to complement the occlusion region, and the resolution of the complemented occlusion region is maintained with a resolution of the sub-reference block, thereby blurring effect of the intermediate image is prevented.

* * * * *